Nov. 19, 1968  R. G. RAKES  3,412,303
STARTING CIRCUIT FOR BRUSHLESS DIRECT CURRENT MOTOR
Filed April 28, 1966  2 Sheets-Sheet 1
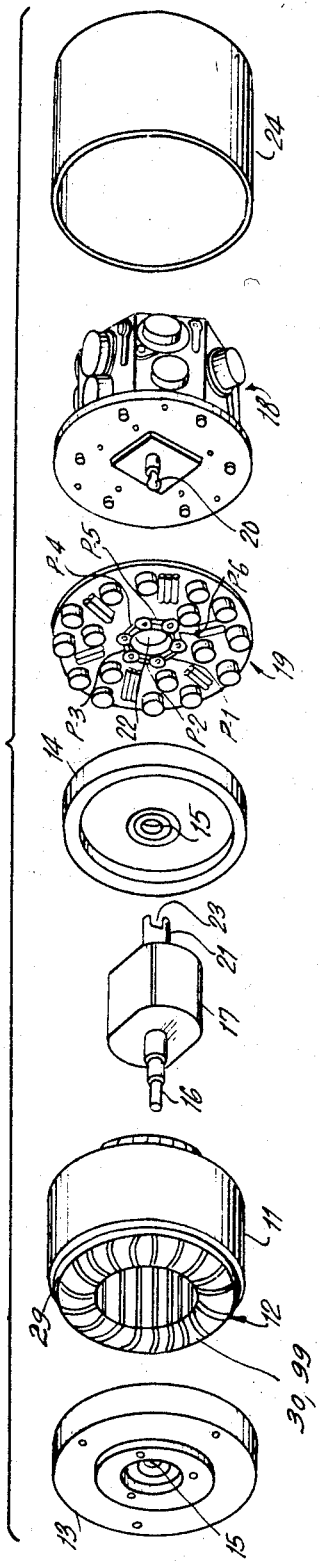
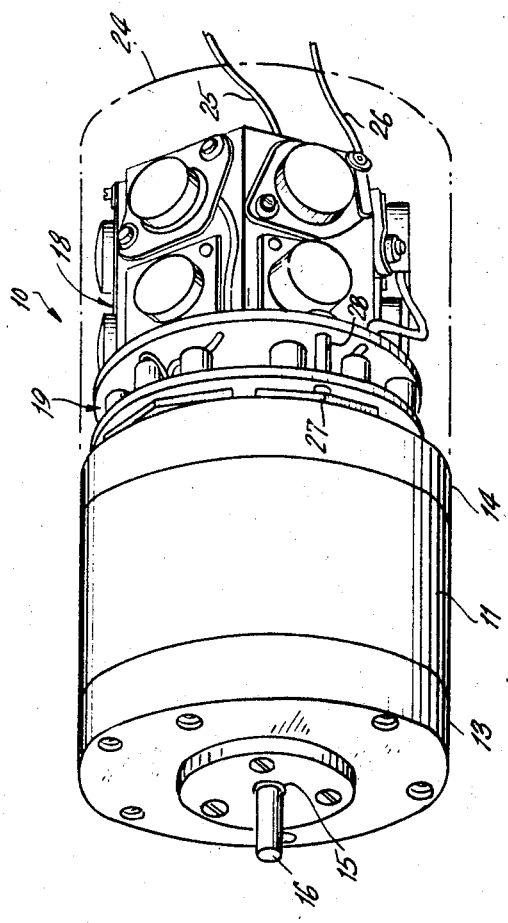
INVENTOR.
RODNEY G. RAKES
BY
Raymond R. Skolnick Nov. 19, 1968  R. G. RAKES  3,412,303
STARTING CIRCUIT FOR BRUSHLESS DIRECT CURRENT MOTOR
Filed April 28, 1966  2 Sheets-Sheet 2

United States Patent Office 3,412,303
Patented Nov. 19, 1968

3,412,303
STARTING CIRCUIT FOR BRUSHLESS
DIRECT CURRENT MOTOR
Rodney G. Rakes, Bristol, Tenn., assignor to Sperry Farragut Company Division, Sperry Rand Corporation, a corporation of Delaware
Filed Apr. 28, 1966, Ser. No. 546,039
7 Claims. (Cl. 318—138)

The instant invention is an improvement over the structure disclosed in copending application Ser. No. 524,016 filed Feb. 1, 1966 and now Patent No. 3,377,534 entitled, "Improved Brushless D.C. Motor," with Roy K. Hill as inventor and assigned to the assignee of the instant invention. More particularly, the instant invention relates to a so-called light commutated brushless D.C. motor having novel means for improving overall efficiency and increasing the life of the light source.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

In a conventional direct current motor commutation is essentially a mechanical switching operation by which currents through the various armature conductors are advanced and cyclicly reversed in sequence as a function of rotor position by motor action. This continuous switching process is accomplished by means of brushes and a segmented commutator so that commutation is unavoidably accompanied by friction, wear, and sparking with its attendant generation of RF noise. These disadvantages of mechanical commutation frequently prohibit the utilization of D.C. motors in critical applications even though performance characteristics and input requirements favor the use of a D.C. motor in all other respects.

The aforesaid copending application Ser. No. 524,016 describes a D.C. motor in which conventional commutation is simulated by an optical sensing system in conjunction with electronic switching by utilizing a permanent magnet rotor for field excitation in combination with a stationary armature winding having a plurality of taps which are sequentially changed in their electrical connection to the energizing source by commutation. The optical sensing system includes a light source fixed to the motor frame for generating a light beam which is directed through an aperature in a shield carried by the rotor and rotatable therewith. The light beam, after passing through the aperture in the shield, impinges upon photoelectric pickup means spaced about the shield so that as the rotor rotates, the light beam scans predetermined portions of the photoelectric means in sequence. As portions of the photoelectric means are illuminated, the impedance level of a circuit control thereby is lowered so that such circuit acts as a closed switch permitting current to pass through the stationary armature at appropriate taps thereof.

The light source, consisting of a single incandescent lamp, is the cornerstone of this brushless commutating system. In order to obtain a substantial increase in the mean-time-to-failure for the lamp, according to the instant invention the lamp is operated at one-quarter of its rated voltage and is placed in series with the motor armature. As will hereinafter be described in detail, in order to successfully operate the lamp at low voltage and in series with the armature to obtain an increase in efficiency by reducing the total power requirement, a novel electronic starting circuit is provided and an auxiliary motor winding is used in conjunction with such starting circuit.

Accordingly, a primary object of the instant invention is to provide a novel construction for a so-called light commutated brushless D.C. machine.

Another object is to provide a machine of this type in which there is a novel starting circuit for energizing the lamp which produces the beam of light necessary for controlled commutation and thereby increases lamp life resulting in more reliable motor operation.

Still another object is to provide a motor of this type having an auxiliary winding used in conjunction with the lamp starting circuit.

These as well as other objects of this invention shall become readily apparent after reading the following description of the accompanying drawings in which:

FIGURE 1 is a perspective of a brushless D.C. motor constructed in accordance with the teachings of the instant invention.

FIGURE 2 is an exploded perspective of the motor of FIGURE 1.

Figure 5:
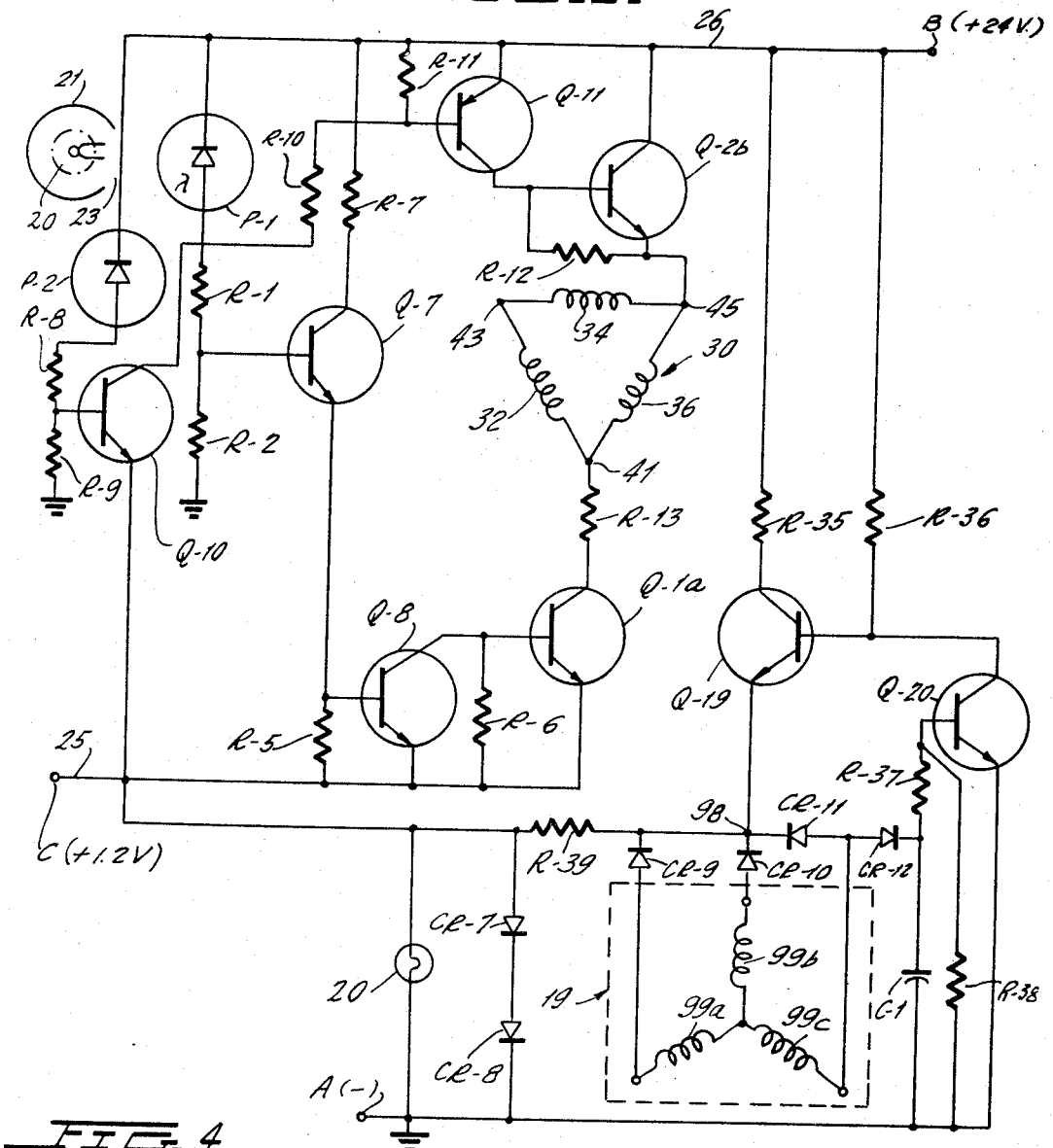
FIGURE 5 is an electrical schematic illustrating the lamp starting circuit and auxiliary winding operated in conjunction therewith, together with two of the six photoelectric switching units of FIGURE 4, one connecting a winding juncture to the negative terminal of the D.C. power supply and the other connecting another winding juncture to the positive terminal of the D.C. power supply.

Now referring to the figures, and more particularly to FIGURE 2. Brushless D.C. motor 10 comprises shell 11 which surrounds stationary armature assembly 12. The ends of shell 11 are covered by front and back end caps 13, 14 respectively, each provided with suitable bearings 15 which rotatably support motor shaft 16. Rotor 17 is a permanent magnet keyed to shaft 16 and disposed within armature assembly 12.

Stationary armature assembly 12 includes relatively low reluctance magnetic member 29 which is laminated and provided with teeth and slots wherein main winding 30 and auxiliary winding 99 (see FIGURE 5) are disposed and held by shell 11. Winding 30 consists of a conductor threading the slots of magnetic member 29 a plurality of times and finally joining the starting point in a closed loop. A plurality of equally spaced taps or juncture points 41, 43, 45 divide winding 30 into three sections or coil portions 32, 34, 36.

Commutation is achieved by means of solid state power switching unit 18 and solid state control and preamplifier unit 19 controlled by light source 20 and shield 21. Units 18 and 19 are mounted to the rear of end cap 14, being operatively positioned by means of appropriate spacers 27, 28. Preamplifier unit 19 includes a plurality of photoelectric devices P–1 through P–6 equally spaced from one another and circularly arranged about shield 21.

Light source 20 is mounted to power switching unit 18 on the forward side thereof and extends through central aperture 22 of preamplifier unit 19 into the interior of shield 21. Shield 21 is keyed to motor shaft 16 and is disposed to the rear of end cap 14 extending through aperture 22. Shield 21 is provided with an aperture 23 so positioned and shaped that light emanating from source 20 and passing through aperture 23 will impinge upon at least two of the photoelectric devices P–1 through P–6 for any position of rotor 17.

Cover 24 is provided as an enclosure for the elements to the rear of end cap 14. An appropriate aperture (not shown) is provided through cover 24 to permit the passage of leads 25, 26 for connecting motor 10 to a source of direct current.

Photoelectric devices P–1 through P–6 are of a type well known to the art which possesses at least two states of conduction. That is, low conductance or high impedance when not illuminated and high conductance or low impedance when illuminated. Since the position of rotor 17 determines the position of shield 21 and aperture 23, the position of rotor 17 determines which photoelectric devices are illuminated. Aperture 23 is wide enough to always illuminate at least two photoelectric devices for any position of shield 21. A third photoelectric device will also be illuminated for a small angle of overlap which, as will hereinafter become apparent, insure that armature 12 will always be energized for starting at all positions of shaft 16. Members Q–1a, Q–2b, Q–3a, Q–4b, Q–5a, and Q–6b are solid state switching elements of the transistor family which are operated as on-off saturated switches in a manner to be hereinafter explained.

Photoelectric device P–1 is connected to operate transistor Q–1a to the saturated "on" state when illuminated and allow Q–1a to remain in the "off" state when not illuminated. Likewise, P–2 operates Q–2b, P–3 operates Q–3a, P–4 operates Q–4b, P–5 operates Q–5a, and P–6 operates Q–6b. At the position shown in FIGURE 3 for shield 21 and aperture 23, photoelectric devices P–1 and P–2 are illuminated by source 20 through aperture 23 while shield 21 blocks passage of light to photoelectric devices P–3, P–4, P–5 and P–6. Thus, P–1 operates switching element Q–1a electrically connecting juncture 41 of winding 30 to line 25, which, as will be hereinafter explained, is approximately 1.2 volts positive with respect to the negative terminal of the 24 volt D.C. power source, and P–2 operates switching element Q–2b electrically connecting juncture 45 of winding 30 to line 26, which is in the positive terminal of the D.C. power source. Under these circumstances, two parts of parallel current paths exist in winding 30 between junctures 41 and 45. One part consists of coil portions 32 and 34 in series and the other part consists of coil portion 36. Electron current flow in these paths produces a magnetic flux pattern in stationary armature 12 which is pre-arranged to be near space quadrature with the field of magnetized rotor 17 such that the rotor will seek magnetic alignment with the field of stationary armature 12 in a pre-determined direction, for example, clockwise rotation.

As rotor 17 rotates clockwise, it carries shield 21 with aperture 23 along until aperture 23 also allows passage of light to photoelectric device P–3. At this position, photoelectric devices P–1, P–2 and P–3 are illuminated operating switching elements Q–1a, Q–2b and Q–3a to the on state. Under these new circumstances, Q–1a electrically connects juncture 41 to line 25, Q–2b electrically connects juncture 45 to line 26, and Q–3a electrically connects juncture 43 to line 25, and different parallel current paths exist from the D.C. power source through winding 30 from juncture 43 to juncture 45. One part of the new parallel current paths exists in coil portion 34 and the second part of parallel current path exists in coil portion 36. This new current path advances the stationary armature flux orientation 30 degrees clockwise from the first recited condition.

As the rotor continues to rotate clockwise, it carries shield 21 to the position where light is blocked to photoelectric device P–1, leaving only devices P–2 and P–3 illuminated. At this third position, P–2 operates Q–2b which electrically connects juncture 45 to line 26, and P–3 operates Q–3 which electrically connects juncture 43 to line 25. Under these new circumstances a third and different set of parallel current paths exist in winding 30. One path is from juncture 43 through coil portions 32 and 36 in series to juncture 45, and the other path is from juncture 43 through coil portion 34 to juncture 45. This new third set of current paths produces another 30 degree clockwise advance of the magnetic flux orientation in the stationary armature and magnetized rotor essentially in space quadrature and the rotor continues to rotate clockwise.

After going through like operations, the rotor finally carries shield 21 and aperture 23 through 180 degrees of rotation where aperture 23 allows passage of light to photoelectric devices P–4 and P–5. Under these circumstances, P–4 operates switching element Q–4b which electrically connects juncture 41 to line 26, and P–5 operates switching element Q–5a which electrically connects juncture 45 to line 25. Under these circumstances two parts of still different parallel current paths exist in winding 30. One part exists in coil portion 36 between junctures 45 and 41, and the second part exists in coil portions 34 and 32 in series between junctures 45 and 41. As is seen, this is the same parallel current path as existed when P–1 and P–2 were illuminated except the direction of current flow is reversed in the winding paths. Thus, the magnetic flux orientation will also be reversed in direction, equivalent to being rotated 180 degrees.

Like action continues as the rotor rotates through 360 degrees. Thus, it is seen that there are twelve discrete sets of parallel current paths provided by the three coil portions 32, 34, 36 and juncture points 41, 43, 45 in conjunction with the associated switching operations. There are six different parallel current paths provided when only pairs of photoelectric devices are illuminated and there are six other different parallel current paths when groups of three photoelectric devices are illuminated for a small angle of overlap. Maximum efficiency occurs when the zones of overlap are kept to a minimum.

This described action continues and the rotor rotates continually seeking magnetic alignment, but in rotating it carries shield 21 and aperture 23, operating the switching means which maintains the average armature flux orientation leading the rotor flux orientation essentially in space quadrature. It is preferred that a condition of exact quadrature occur between rotor and stator when shield 21 and aperture 23 is symmetrical about pairs of photoelectric devices.

Figure 3:
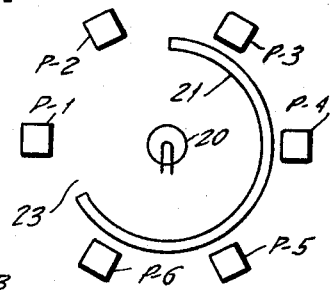
FIGURE 3 is a schematic representation of the rotor position detecting portion of the motor illustrated in FIGURES 1 and 2.

Now consider the operation of a pair of switching elements typically represented by the schematic of FIGURE 5, the switching elements rendered energized when photoelectric devices P–1 and P–2 are illuminated at the position of shield 21 and aperture 23 as shown in FIGURES 3 and 5.

The illumination of P–1 causes electron current flow from ground A through resistors R–1, R–2 raising the potential at the base of transistor Q–7 completing a relatively low impedance path for electron current flow from lead 25 through the emitter to base junction of transistor Q–8, to the emitter of Q–7, from the emitter to base of Q–7, through current limiting resistor R–1, through photoelectric device P–1 to lead 26. This emitter to base current of Q–7 is sufficient to create a low impedance path from emitter to collector of Q–7. Consequently, a second larger electron current flows in the now relatively low impedance path from lead 25 through the emitter to base junction of Q–8, from the emitter to collector of Q–7, through R–7 to lead 26. When this second electron current flows, a low impedance condition is created from the emitter to collector of Q–8 and a third and still larger electron current flows through the now relatively low impedance path from lead 25 to the emitter of Q–8, from the emitter to collector of Q–8, thence through the connection between the collector of Q–8 to the base of Q–1a, from the base to collector of Q–1a, thence through resistor R–13 to juncture 41 of winding 30, through winding 30 to juncture 45, thence through another energized switching circuit, functionally equivalent to Q–1a, being rendered active by photoelectric device P–2, which is represented by Q–2b of FIGURE 4a, the operation which will be described hereinafter, to line 26.

When this third electron current flows, a low impedance condition is created from the collector to emitter of Q–1a and a fourth and still larger electron current flows in the now relatively low impedance path from lead 25 to the emitter of Q–1a, from the emitter to collector of Q–1a, through R–13 to junction 41 of winding 30, through winding 30 to juncture 45, thence through the other energized switching circuit, Q–2b hereinbefore mentioned, to line 26.

Specifically, the operation of the last recited switching circuit, Q–2b, hereinbefore mentioned, is described as follows:

Photoelectric device P–2, being illuminated as before state, causes electron flow from ground through resistors R–8, R–9 raising the potential at the base of transistor Q–10 completing the path for electron current flow from line 25 to the emitter of Q–10, from emitter to base of Q–10, through current limiting resistor R–8, through photoelectric device P–2 to line 26. This emitter to base current of Q–10 is sufficient to create a low impedance path from emitter to collector of Q–10. Consequently, a second larger electron current flows in the relatively low impedance path from lead 25 through emitter to collector of Q–10, through current limiting resistor R–10 to the base of Q–11, thence from base to emitter of Q–11, to lead 26.

When this third electron current flows, a low impedance condition is created from the emitter to collector of Q–2b and a fourth and still larger electron current flows in the now relatively low impedance path from juncture 43 of winding 30 again picking up current passed to winding 30 by the switching element rendered active by photoelectric device P–1, hereinbefore described, to the emitter of Q–2b, from the emitter to collector of Q–2b to line 26.

These electron current paths of each switching element drop in impedance in a rapid almost instantaneous sequence with a switching time in the order of microseconds which is an insignificant portion of the illumination time for the photoelectric devices.

Resistors R–1 and R–2 are connected between photoelectric device P–1 and lead ground with the juncture between these resistors being connected to the base of Q–7. Resistor R–5 is connected between the base and emitter of Q–8. Resistor R–7 is connected between the collector of Q–7 and lead 26. Resistor R–6 is connected between the emitter and base of Q–1a.

Resistors R–8 and R–9 are connected between photoelectric device P–2 and ground with the juncture between these resistors being connected to the base of Q–10. Resistor R–11 is connected between the emitter and base of transistor Q–11. Resistor R–12 is connected between the emitter and base of transistor Q–2b. Resistor R–10 is connected between the collector of Q–10 and the base of Q–11. Resistors R–2, R–5, R–6, R–9, R–11 and R–12 stabilize the associated transistors by shunting some of the transistor leakage current around the base-emitter junction.

Figure 4:
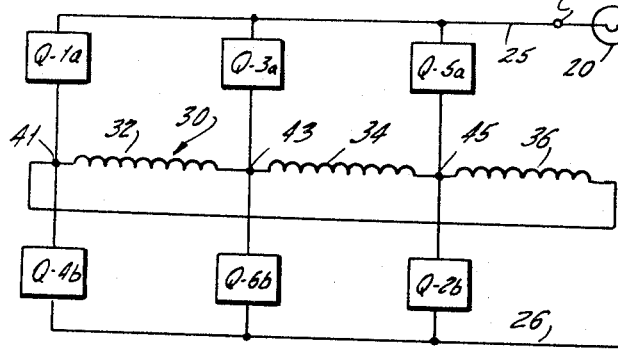
FIGURE 4 is a schematic illustrating the stationary armature winding and its connections to the D.C. energizing source through the electronic switching devices typically illustrated in FIGURE 5.

Photoelectric device P–1, followed by amplifying transistors Q–7, Q–8 and Q–1a along with the associated resistors R–1, R–2, R–5, R–6, R–7 and R–13 comprise the switching element shown by block Q–1a in FIGURE 4a. Photoelectric device P–2 followed by amplifying transistors Q–10, Q–11, and Q–2b, along with associated resistors R–8, R–9, R–10, R–11 and R–12 comprise the switching element shown by block Q–2b in FIGURE 4.

Lamp 20, by being connected directly from ground to bus 25, is in electrical series with main motor winding 30 across the D.C. supply energizing motor 10. The series combination of diodes CR7, CR8, forward connected in parallel with lamp 20, limits the voltage across lamp 20 to approximately 1.2 volts. Immediately upon the application of 24 volts D.C. between ground and positive terminal B transistor Q–19 is forward biased through resistor R–36 connected from the base of Q–19 to line 26. Thus, Q–19 is switched on permitting current to flow through the lamp-diode combination 20, CR7, CR8, and resistor R–39 connected between lamp-diode combination 20, CR7, CR8 and the emitter of Q–19.

Lamp 20 is now illuminated thereby causing certain of the photoelectric devices P–1 through P–6 to conduct thereby actuating their associated switching or commutating elements so that current may flow through main winding 30. This increases the current drawn through lamp-diode combination 20, CR7, CR8.

The rotation of rotor 17 causes auxiliary winding 99 to generate a three-phase voltage. The common point for the wye connected winding sections 99a, 99b, 99c of auxiliary winding 99 is grounded and the other ends of winding sections 99a, 99b, 99c are connected through rectifiers CR9, CR10, CR11, respectively, to junction 98 between R–39 and the emitter of Q–19. When rotor 17 reaches a speed that is approximately 50 percent of rated speed, sufficient voltage is induced in auxiliary winding 99 to switch on transistor Q–20 whose base is connected through resistor R–37 and diode CR12 to the junction between diode CR11 and winding section 99c. The action essentially drives the base of Q–19 to ground potential and back biases the base emitter junction of Q–19 so that Q–19 ceases conduction and lamp 20 now receives its current through the commutating circuitry and main winding 30. Capacitor C–1, connected to ground from the junction between diode CR12 and R–37, provides filtering while resistor R–38 connected from ground to the base of Q–20 acts in conjunction with R–37 to constitute a voltage divider which determines the rotor speed at which Q–20 is switched on.

It is noted that the no-load current of motor 10 is equal to or less than the current required for proper illumination of lamp 20 so that under no-load conditions the additional current required for illumination of lamp 20 comes from the power supply consisting of auxiliary winding 99 and rectifiers CR9, CR10, and CR11. Diode CR12 is provided in order to prevent Q–12 from receiving bias current through the commutating elements rather than auxiliary winding 99. The value of resistor R–35, connected from the collector of Q–19, to line 26, is chosen to limit starting current to an optimum value.

In summary, Q–19 supplies current to lamp 20 on starting but is back biased and cut off by Q–20 during normal motor operation. A by-product of the lamp starting circuit is the 1.2 volt potential produced at line 25 by diodes CR7, CR8 with this 1.2 volt potential above ground serving as a back bias applied to the base of the first transistor in each of the six commutating switching circuit portions. More particularly, Q–7 is the first transistor in the commutating circuit portion associated with photoelectric device P–1 and Q–10 in the first transistor associated with photoelectric device P–2. The emitters of Q–7 and Q–10 are at +1.2 volts while their bases are grounded when photo devices P–1, P–2 are not illuminated. This back bias on the first transistor stage insures that the preamplifier transistors are back biased and cut off when their associated photo devices are not illuminated.

Thus, it is seen that the instant invention provides a novel construction whereby increased life and increased efficiency is obtained for the lamp providing illumination in a so-called light commutated brushless D.C. motor. The increased life and efficiency (output power divided by input power) is achieved by placing the lamp in series with the main motor winding, regulating the voltage across the lamp and providing a generator for supplying additional current required by the lamp when the motor is operating under no-load conditions.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. In a brushless D.C. motor having input terminals for the connection of D.C. power for energizing said motor, a torque producing unit and a static switching means; said unit including a stationary armature and a permanent magnet rotor mounted in magnetic coupling relationship; said armature including main winding means having a plurality of taps between which current flows through said main winding means; said static switching means including a radiation source, unidirectional current carrying switching sections interposed between said taps and said input terminals, devices responsive to radiation generated by said radiation source upon energization thereof, said devices connected in circuit with said switching sections whereby impingement of radiation from said radiation source upon predetermined elements operates predetermined switching sections from high to low impedance states, and means mounted to said rotor and physically spaced from said devices for directing radiation generated by said radiation source to impinge upon at least one of said devices for any given angular position of said rotor whereby portions of said static switching means connected to different ones of said taps provide portions of a complete unidirectional current path between said input terminals and through said main winding means; the improvement comprising a starting means for said radiation source; said radiation source and said main winding means connected in electrical series between said terminals, said starting means including a first and a second section; said first section providing a relatively low impedance current path through which said radiation source is connected to said terminals and energized upon the application of D.C. power to said terminals even prior to impingement of said radiation upon any of said devices; and said second section connected to said first section for operation thereof to a relatively high impedance state while said torque producing unit is in operation.

2. A motor as set forth in claim 1 in which the radiation source is a lamp and light rays emanating therefrom constitute the radiation to which said devices are responsive.

3. A motor as set forth in claim 1 in which the second section of the starting means includes an auxiliary winding in magnetic coupling relationship with said rotor whereby said auxiliary winding generates a voltage upon rotation of said rotor with the magnitude of said voltage reaching a predetermined level when said rotor reaches a predetermined speed of rotation; with D.C. power applied to said terminals said first section being in a relatively low impedance state and remaining in said relatively low impedance state so long as said voltage remains below said predetermined level.

4. A motor as set forth in claim 3 in which the starting circuit includes a voltage regulator connected in parallel with said radiation source.

5. A motor as set forth in claim 4 in which there is a rectifier means connecting said auxiliary winding to said voltage regulator, said radiation source and said armature having relative impedances such that during no-load operation of said motor a portion of energizing current for said radiation source is supplied by said auxiliary winding.

6. A motor as set forth in claim 5 in which the radiation source is a lamp and light rays emanating therefrom constitute the radiation to which said devices are responsive.

7. A motor as set forth in claim 3 in which there is a point at a potential intermediate the potential appearing between said input terminals upon energization thereof, said lamp connected between said point and a first of said input terminals, said switching sections and said main winding connected between said point and a second of said input terminals, each of said switching sections comprising a plurality of cascaded solid state amplifying stages with one of said stages constituting an input stage connected to one of said taps and another of said stages constituting an input stage connected to one of said devices, said potential appearing at said point connected to said input stages and acting to bias each of said input stages to a relatively high impedance state until its connected device is subjected to said radiation.

References Cited

UNITED STATES PATENTS

| | | | |
|---|---|---|---|
| 3,242,406 | 3/1966 | Tanaka | 318—138 |
| 3,280,396 | 10/1966 | Beck et al. | 318—138 |
| 3,319,104 | 5/1967 | Yasuoka et al. | 318—138 |

ORIS L. RADER, *Primary Examiner.*

GLEN R. SIMMONS, *Assistant Examiner.*